US012151887B2

(12) United States Patent
Kim

(10) Patent No.: US 12,151,887 B2
(45) Date of Patent: Nov. 26, 2024

(54) AUTOMATED GUIDED VEHICLE, SYSTEM FOR SORTING CARGO AND METHOD THEREOF

(71) Applicant: Gachisoft Inc., Daejeon (KR)

(72) Inventor: Ho Yon Kim, Sejong (KR)

(73) Assignee: Gachisoft Inc., Daejeon (KR)

( * ) Notice: Subject to any disclaimer, the term of this patent is extended or adjusted under 35 U.S.C. 154(b) by 614 days.

(21) Appl. No.: 17/488,774

(22) Filed: Sep. 29, 2021

(65) Prior Publication Data

US 2023/0101013 A1 Mar. 30, 2023

(30) Foreign Application Priority Data

Sep. 29, 2021 (KR) .................. 10-2021-0129190

(51) Int. Cl.
| | |
|---|---|
| *B65G 1/04* | (2006.01) |
| *B60P 1/00* | (2006.01) |
| *B60P 1/04* | (2006.01) |
| *B65G 1/06* | (2006.01) |
| *B65G 1/137* | (2006.01) |

(52) U.S. Cl.
CPC ............ *B65G 1/0492* (2013.01); *B60P 1/006* (2013.01); *B60P 1/04* (2013.01); *B65G 1/065* (2013.01); *B65G 1/1373* (2013.01)

(58) Field of Classification Search
CPC .... B65G 1/0492; B65G 1/065; B65G 1/1373; B60P 1/006; B60P 1/04
See application file for complete search history.

(56) References Cited

U.S. PATENT DOCUMENTS

| | | | |
|---|---|---|---|
| 5,990,437 A | 11/1999 | Coutant et al. | |
| 6,460,681 B1 | 10/2002 | Coutant et al. | |
| 8,424,670 B2 | 4/2013 | Van Den Goor | |
| 10,464,106 B1 * | 11/2019 | Mo ..................... | B65G 1/1373 |

(Continued)

FOREIGN PATENT DOCUMENTS

KR 10-2017-0045503 A 4/2017

OTHER PUBLICATIONS

PCT International Search Authority search report issued on Jun. 22, 2022, in counterpart U.S. Appl. No. 17/488,774, (3 pages in Korean).

(Continued)

*Primary Examiner* — Saul Rodriguez
*Assistant Examiner* — Ashley K Romano
(74) *Attorney, Agent, or Firm* — NSIP Law

(57) ABSTRACT

An automated guided vehicle, a system for sorting cargo, and a method of sorting cargo using the same are provided. The system for sorting cargo according to an embodiment includes an automated guided vehicle, a cargo supply unit, a plurality of cargo sorting units, a supply control unit configured to load the plurality of pieces of cargo supplied from the cargo supply unit into the plurality of cargo loading units of the automated guided vehicle, a transport control unit configured to transport the pieces of cargo to each cargo sorting unit while controlling a movement path of the automated guided vehicle into which the plurality of pieces of cargo are loaded; and a discharge control unit configured to discharge at least one piece of cargo transported through the automated guided vehicle to each cargo sorting unit to sort the at least one piece of cargo.

16 Claims, 13 Drawing Sheets

(56) References Cited

U.S. PATENT DOCUMENTS

| | | |
|---|---|---|
| 10,549,916 B2 | 2/2020 | Pajevic et al. |
| 10,889,441 B1 | 1/2021 | Pajevic et al. |
| 11,084,666 B1 | 8/2021 | Eddy et al. |
| 2008/0011546 A1* | 1/2008 | Korchagin ........... B65G 1/0407 |
| | | 187/239 |
| 2010/0320062 A1 | 12/2010 | Van Den Goor |
| 2011/0049931 A1* | 3/2011 | Gagnon .................... B60P 1/04 |
| | | 296/182.1 |
| 2018/0052038 A1* | 2/2018 | Minoshima ............... B60P 1/04 |
| 2019/0291956 A1 | 9/2019 | Pajevic et al. |
| 2020/0346867 A1* | 11/2020 | Kim ....................... B65G 47/53 |
| 2021/0347569 A1* | 11/2021 | Dayrell .................. B66B 9/003 |

OTHER PUBLICATIONS

PCT International Search Authority written opinion issued on Jun. 22, 2022, in counterpart U.S. Appl. No. 17/488,774, (3 pages in Korean).

* cited by examiner

AUTOMATED GUIDED VEHICLE, SYSTEM FOR SORTING CARGO AND METHOD THEREOF

CROSS-REFERENCE TO RELATED APPLICATION(S)

This application claims priority from Korean Patent Application No. 10-2021-0129190, filed on Sep. 29, 2021, in the Korean Intellectual Property Office, the disclosure of which is incorporated herein by reference in its entirety.

BACKGROUND

1. Field

The following description relates to logistics processing technology, and more particularly, to cargo transport and sorting technology.

2. Description of Related Art

The demand for high-speed cargo processing is increasing due to the growth of parcel delivery markets and the construction of base-type logistics centers. The cargo processing in logistics centers is evolving from partial automation to full automation. Accordingly, the demand for a system for sorting cargo that automatically sorts pieces of cargo is increasing.

Fully automated logistics may be built using an automated guided vehicle (AGV). The AGV moves through a combination of software and a sensor-based guidance system. Acceleration, deceleration, and obstacle detection bumpers are precisely controlled, and pieces of cargo may be transported safely and stably.

SUMMARY

The following description relates to an automated guided vehicle, a system for sorting cargo, and a method of sorting cargo using the same that is capable of transporting a plurality of pieces of cargo using an automated guided vehicle and discharging the pieces of cargo to a plurality of cargo sorting units for sorting.

In one general aspect, a system for sorting cargo includes an automated guided vehicle including a plurality of cargo loading units and configured to transport a plurality of pieces of cargo loaded into the plurality of cargo loading units and discharge the pieces of cargo to at least one piece of cargo sorting unit, a cargo supply unit configured to supply the plurality of pieces of cargo to the automated guided vehicle, a plurality of cargo sorting units from which at least one piece of cargo loaded into the automated guided vehicle is discharged, a supply control unit configured to load the plurality of pieces of cargo supplied from the cargo supply unit into the plurality of cargo loading units of the automated guided vehicle, a transport control unit configured to transport the plurality of pieces of cargo to each cargo sorting unit while controlling a movement path of the automated guided vehicle into which the pieces of cargo are loaded, and a discharge control unit configured to discharge at least one piece of cargo transported through the automated guided vehicle to each cargo sorting unit to sort the at least one piece of cargo.

The automated guided vehicle may include: a body; a plurality of supports mounted on an upper portion of the body; the plurality of cargo loading units supported by each support, having a space into which at least one piece of cargo is loadable, and having the at least one piece of cargo loaded in the space; and a plurality of wheels mounted on a lower portion of the body.

Each cargo loading unit may change its phase so that the cargo loading units are horizontal or have an inside tilted low to prevent the loaded cargo from falling when entering a ready mode and a moving mode, and then have an outside tilted low when entering a discharge mode.

The discharge control unit may individually control each cargo loading unit when entering a discharge mode to tilt a predetermined cargo loading unit and discharge at least one piece of cargo loaded into a corresponding cargo loading unit to a predetermined cargo sorting unit.

Each automated guide vehicle may include a plurality of holding members, the supply control unit may hold the plurality of cargo loading units through each holding member when the automated guided vehicle enters a ready mode, and the discharge control unit may release holding of a predetermined holding member when the automated guided vehicle enters a discharge mode, and discharge cargo in the corresponding cargo loading unit to a predetermined cargo sorting unit as the cargo loading unit whose holding is released has an outside tilted low due to gravity.

The system for sorting cargo may further include a tilted guide that is located on a movement path to which the automated guided vehicle returns and includes a tilted part, in which the automated guided vehicle may discharge the plurality of pieces of cargo to the plurality of cargo sorting units and may then be switched to a ready mode by being pushed up as the tilted cargo loading unit climbs up the tilted part on the movement path to which the automated guided vehicle returns.

Each cargo loading unit may include at least one transverse membrane slidable therein, and the discharge control unit may slide a predetermined transverse membrane to push at least one piece of cargo and discharge the cargo to a predetermined cargo sorting unit.

Each cargo loading unit may include: a first transverse membrane configured to slide in a first direction; and a second transverse membrane configured to slide in a second direction.

Each cargo loading unit may include a third transverse membrane configured to slide in a plurality of directions.

The discharge control unit may push cargo by selecting a predetermined direction from among the plurality of directions when discharging the cargo using the third transverse membrane.

The supply control unit may determine a size of cargo to be loaded into a predetermined cargo loading unit and change an initial location of the transverse membrane in the corresponding cargo loading unit according to the size The automated guided vehicle may include two driving devices configured to rotate by power of a driving shaft, a moving bar configured to connect two driving devices and move together when the two driving devices rotate, a plurality of attachments configured to shift a phase on the moving bar, and a transverse membrane configured to be erected or laid down by the phase shift of each attachment and push cargo in accordance with a movement of the moving bar when erected.

The automated guided vehicle may include at least one conveyor belt including the plurality of cargo loading units, and each cargo loading unit may be divided through a plurality of attachments for dividing a plurality of areas of each conveyor belt.

The discharge control unit may select a discharge of cargo according to a transport distance of each conveyor belt.

The plurality of cargo sorting units may be divided through a plurality of attachments on a conveyor, divided into a virtual location on the conveyor, or divided through a plurality of tote boxes provided on the conveyor.

In another aspect, a method of sorting cargo using a system for sorting cargo includes: dynamically mapping a divided area to a plurality of attachments or virtual locations on a conveyor of a cargo sorting unit with a chute for cargo sorting according to a sorting scheme; sorting and loading cargo into divided locations on a conveyor of the cargo sorting unit; transporting the conveyor in division unit to collect the sorted and loaded cargo into the divided cargo sorting unit, collecting the cargo by sorted unit, and delivering information of the collected cargo and the sorted cargo to a following processing operation; and sequentially transporting the sorted and loaded pieces of cargo across the conveyor in division unit, emptying the entire line, and if necessary, repeating a preparation for a next sorting operation.

Other features and aspects will be apparent from the following detailed description, the drawings, and the claims.

Figure 1:
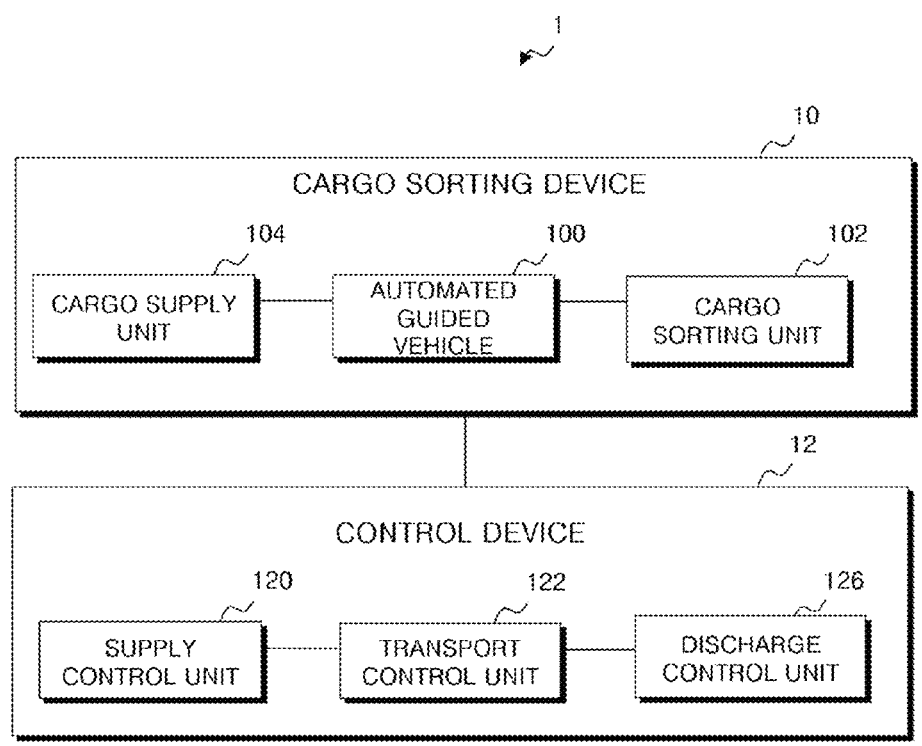
FIG. 1 is a diagram illustrating a configuration of a system for sorting cargo according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Various advantages and features of the present invention and methods accomplishing the same will become apparent from the following detailed description of embodiments with reference to the accompanying drawings. However, the present invention is not limited to exemplary embodiments to be described below but may be implemented in various different forms, these exemplary embodiments will be provided only in order to make the present invention complete and allow those skilled in the art to completely recognize the scope of the present invention, and the present invention will be defined by the scope of the claims. Throughout the specification, like reference numerals denote like elements.

When it is determined that the detailed description of the known functions or configurations in describing the embodiments of the present invention may obscure the gist of the present invention, the detailed description thereof will be omitted, and the following terminologies are defined in consideration of the functions in the embodiments of the present invention and may be construed in different ways by users, an intention of operators, or conventions. Therefore, the definitions thereof should be construed based on the contents throughout the specification.

Combinations of each block of the accompanying block diagram and each step of the accompanying flow chart may also be performed by computer program instructions (execution engine), and since these computer program instructions may be mounted in a processor of a general computer, a special computer, or other programmable data processing apparatuses, these computer program instructions executed through the process of the computer or the other programmable data processing apparatuses create a means for performing functions described in each block of the block diagram or each step of the flow chart.

Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including an instruction means performing the functions described in each block of the block diagram or each step of the flow chart.

Then, since the computer program instructions may also be mounted on the computer or the other programmable data processing apparatuses, the instructions perform a series of operation steps on the computer or the other programmable data processing apparatuses to create processes executed by the computer, thereby operating the computer or the other programmable data processing apparatuses may also provide steps for performing the functions described in each block of the block diagram or each step of the flow chart.

In addition, each block or each step may indicate some of modules, segments, or codes including one or more executable instructions for executing a specific logical function (specific logical functions). Further, it is to be noted that functions described in the blocks or the steps occur regardless of a sequence in some alternative embodiments. For example, two blocks or steps that are consecutively shown may actually be simultaneously performed or may be performed in a reverse sequence depending on corresponding functions.

Hereinafter, embodiments of the present invention will be described in detail with reference to the accompanying drawings. Exemplary embodiments in the present invention may be modified in many different forms and the scope of the present invention is limited to exemplary embodiments to be described below. The embodiments of the present invention are provided to more completely explain the present invention to those of ordinary skill in the art to which the present invention pertains.

FIG. 1 is a diagram illustrating a configuration of a system for sorting cargo according to an embodiment of the present invention.

Referring to FIG. 1, a system 1 for sorting cargo includes a cargo sorting device 10 and a control device 12. The cargo sorting device 10 includes an automated guided vehicle 100, a plurality of cargo sorting units 102, and a cargo supply unit 104. The control device 12 includes a supply control unit 120, a transport control unit 122, and a discharge control unit 124.

The cargo supply unit 104 is a device that supplies cargo to the automated guided vehicle 100. The cargo supply unit 104 may supply a plurality of pieces of cargo to the automated guided vehicle 100 while transporting the pieces of cargo through a conveyor belt. In this case, pieces of cargo may be supplied to the automated guided vehicle 100 one by one using a robot arm provided in the cargo supply unit 104. The cargo supply unit 104 may be provided as a plurality of cargo supply unit.

The automated guided vehicle 100 is a small transport vehicle that may freely move within a workplace, and is a device for sorting a plurality of pieces of cargo by carrying the plurality of pieces of cargo and then dropping the plurality of pieces of cargo to the plurality of cargo sorting units 102. The automated guided vehicle 100 may be provided as a plurality of automated guided vehicles. The automated guided vehicle 100 may move along a movement path where markers such as lines are attached to a floor or may move by autonomous driving.

The plurality of cargo sorting units 102 are devices in which pieces of cargo are discharged and sorted from the automated guided vehicle 100. The plurality of sorting units 102 may be discharge chutes, compartments, conveyors, and the like. The plurality of cargo sorting units 102 may be formed as a conveyor to which a plurality of attachments are attached and may be in the form of a plurality of tote boxes mounted on the conveyor. When a plurality of cargo sorting units 102 are in the form of the conveyor, the automated guided vehicle 100 discharges and sorts pieces of cargo to the conveyor, and when the sorting operation is finished, the conveyor moves to process the pieces of cargo loaded into each cargo sorting unit 102. An example in which the plurality of cargo sorting units 102 are formed as the conveyor will be described below with reference to FIGS. 11 and 12.

It is possible to move and sort one piece of cargo using the automated guided vehicle 100, but it is not efficient to load and sort pieces of cargo one by one. The automated guided vehicle 100 of the present invention may load a plurality of pieces of cargo at once, sort the loaded pieces of cargo into the plurality of cargo sorting units 102, and then return to a location where the cargo supply unit 104 is located.

A method in which the automated guided vehicle 100 is equipped with a robot arm, carries a plurality of pieces of cargo and then takes out the pieces of cargo one by one using the robot arm, and discharges the pieces of cargo to the cargo sorting unit 102 is also possible. In this case, there is a problem in that a robot's unit price is high, it is not easy to pick up pieces of cargo when the pieces of cargo are taken out, and a weight thereof is heavy. Accordingly, the present invention proposes a technology capable of efficiently, simply, inexpensively, and efficiently discharging a plurality of individual pieces of cargo without using the robot arm using the automated guided vehicle 100.

The supply control unit 120 of the control device 12 loads a plurality of pieces of cargo supplied from the cargo supply unit 104 into a plurality of loading units in the automated guided vehicle 100. The transport control unit transports a plurality of pieces of cargo to each cargo sorting unit while controlling a movement path of the automated guided vehicle into which the pieces of cargo are loaded. The discharge control unit 124 discharges at least one piece of cargo transported to each cargo sorting unit 102 for sorting.

Figure 2:
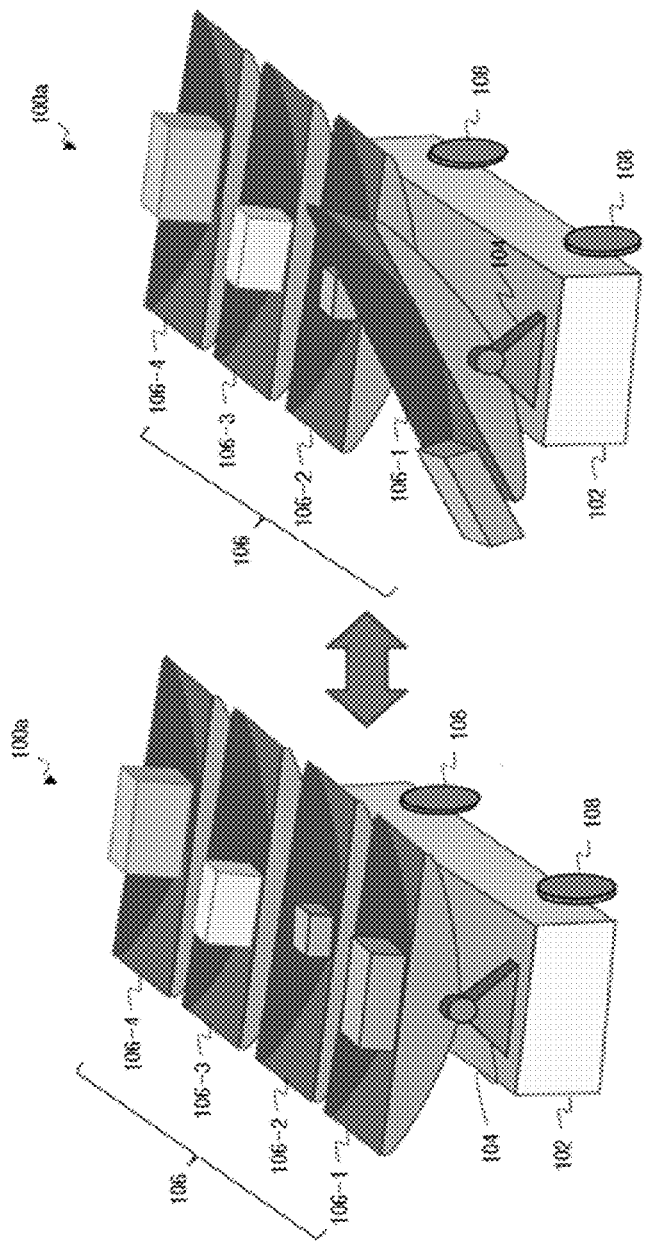
FIGS. 2 and 3 are diagrams illustrating a tiltable automated guided vehicle according to an embodiment of the present invention.
Figure 3:
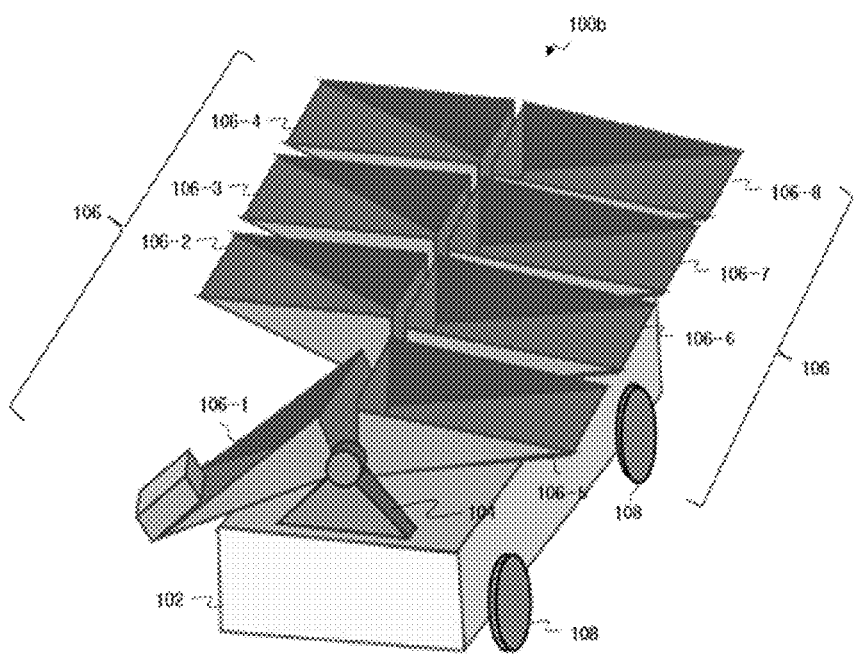

FIGS. 2 and 3 are diagrams illustrating a tiltable automated guided vehicle according to an embodiment of the present invention.

Referring to FIGS. 1 to 3, automated guided vehicles 100a and 100b each include a body 102, a support 104, a plurality of loading units 106, and a wheel 108.

The automated guided vehicles 100a and 100b each load a plurality of pieces of cargo into the plurality of cargo loading units 106 when entering a ready mode, and move the plurality of pieces of cargo loaded into the plurality of cargo loading units 106 when entering a moving mode, and discharge the plurality of pieces of cargo to the plurality of cargo sorting units when entering the discharge mode and then returns to the ready mode. In the automated guided vehicles 100a and 100b, the cargo loading unit 106 may be horizontal or have an inside tilted low to prevent the loaded cargo from falling out when entering the ready mode and the moving mode and have an outside tilted low when entering the discharge mode.

The plurality of cargo loading units 106 are each supported by the support 104 and have a space in which a plurality of pieces of cargo are loadable, and the plurality of pieces of cargo are loaded in the space. Each cargo loading unit 106 may have any shape as long as it has the space in which pieces of cargo are loadable. The support 104 is mounted on the body 102 to support the cargo loading unit 106.

Each cargo loading unit 106 is separate from each other and is tiltable. The discharge control unit 124 individually controls each cargo loading unit 106 as illustrated in FIGS. 2 and 3, tilts the predetermined cargo loading unit 106 outward when entering the discharge mode, and discharges at least one piece of cargo loaded therein to the cargo sorting unit. In this case, when the cargo loaded in the predetermined cargo loading unit arrives at the cargo sorting unit from which the cargo is to be discharged, the discharge control unit 124 individually controls only the corresponding cargo loading unit and discharges the cargo to the cargo sorting unit at which the cargo arrives and does not discharge pieces of cargo loaded in other cargo loading units until the pieces of cargo arrive at the other cargo sorting units from which the pieces of cargo are to be discharged.

FIG. 2 illustrates four cargo loading units 106-1, 106-2, 106-3, and 106-4, and FIG. 3 illustrates cargo loading units 106-1, 106-2, 106-3, 106-4, 106-5, 106-6, 106-7, and 106-8, but this is only for aiding in understanding of the present invention, and the number of cargo loading units is not limited thereto.

The automated guided vehicle 100a of FIG. 2 has a structure in which pieces of cargo may discharge in both left and right directions as it is tilted in both the left and right direction using each cargo loading unit 106-1, 106-2, 106-3, and 106-4 fixed to each support part 104. On the other hand, an example in which the automated guided vehicle 100b of FIG. 3 has one of the cargo loading units 106-1, 106-2, 106-3, and 106-4 for discharging pieces of cargo in the left direction and one of the cargo loading units 106-5, 106-6, 106-7, and 106-8 for discharging pieces of cargo in the right direction, respectively, which are mounted in pairs on one support 104, is illustrated.

When a motor individually controlling the cargo loading units 106 is configured, the device becomes complicated. Accordingly, a technology for simply tilting the cargo loading unit 106 is proposed. To this end, the cargo loading unit 106 may include a holding member (not illustrated).

The supply control unit 120 may independently load at least one piece of cargo into each cargo loading unit 106. The discharge control unit 124 may control the cargo loading unit 106 to be tilted toward the cargo sorting unit due to gravity when a predetermined cargo loaded on the cargo loading unit 106 is loaded into the cargo sorting unit. For example, since the cargo loading unit 106 deviates from a center of gravity, the supply control unit 120 is holding the cargo loading unit 106 loaded with at least one piece of cargo using the holding member, and then, when the automated guided vehicles 100a and 100b arrive at the cargo sorting unit, the discharge control unit 124 releases the holding of the holding member. Accordingly, the cargo loading unit 106 whose holding is released may be tilted outward by gravity to discharge the cargo in the cargo loading unit 106 to the cargo sorting unit.

The holding member may be, for example, a latch, an electromagnet, or the like. The supply control unit 120 causes the cargo loading unit 106 to be caught on the latch or attached to the electromagnet when the automated guided vehicles 100a and 100b are in the ready mode and the transport state. The discharge control unit 124 drops the cargo in the cargo loading unit 106 to the cargo sorting unit by releasing the holding of the holding member when the automated guided vehicles 100a and 100b are in the discharge mode. Examples of the method of releasing the holding includes a method of releasing magnetism by allowing a solenoid or electricity to flow, and a method of releasing the latch by pushing the latch with an actuator, and the like.

The tilted cargo loading unit 106 may be erected again to discharge the cargo to the cargo sorting unit. To this end, the system 1 for sorting cargo may further include a tilted guide (not illustrated) in the movement path of the automated guided vehicles 100a and 100b. For example, the automated guided vehicles 100a and 100b have the tilted guide (not illustrated) provided on the movement path through which pieces of cargo pass so that the pieces of cargo are unloaded into the cargo sorting unit and are then loaded again, and switches the automated guided vehicles 100a and 100b to the ready mode as the tilted guide automatically pushes up the tilted side of the cargo loading unit 106 during the movement of the automated guided vehicles 100a and 100b. When the tilted guide pushes up the cargo loading units 106 of the automated guided vehicles 100a and 100b, the tilted guide is caught on the latch or attached to an electromagnet, and thus, the automated guided vehicles 100a and 100b are in the ready mode again.

To this end, the tilted guide is located on the movement path to which the automated guided vehicles 100a and 100b return and includes a tilted part. The automated guided vehicles 100a and 100b discharge the plurality of pieces of cargo to the plurality of cargo sorting units and then are switched to the ready mode by being pushed up as the tilted cargo loading unit 106 climbs up the tilted part on the movement path to which the automated guided vehicle returns.

Figure 4:
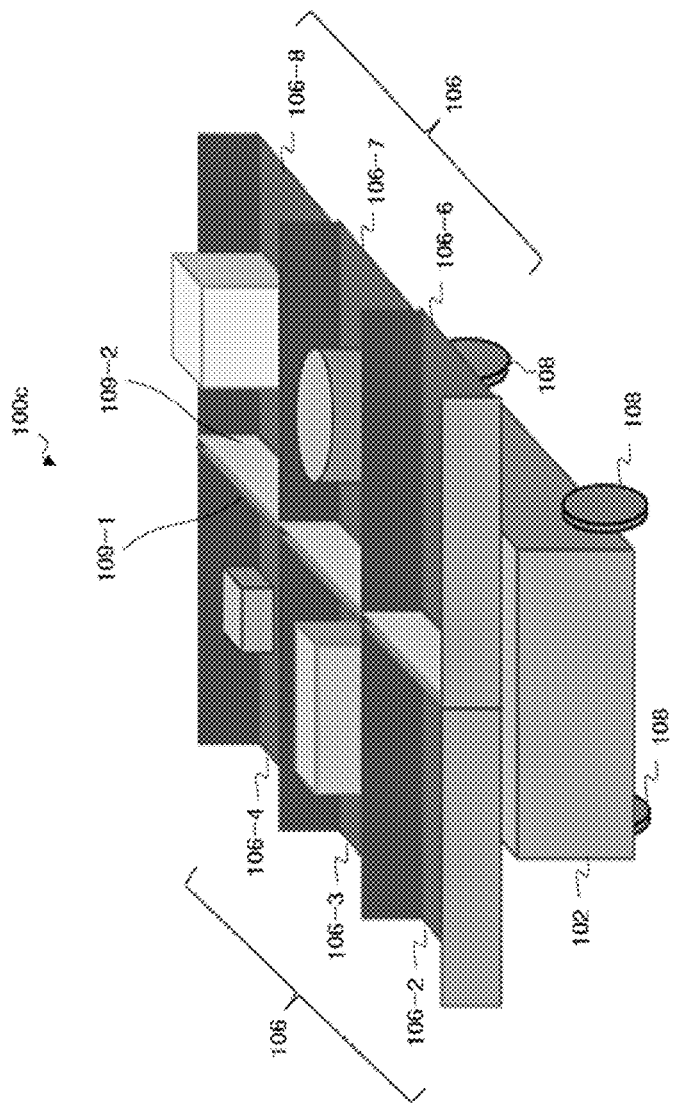
FIGS. 4 and 5 are diagrams illustrating an automated guided vehicle using a transverse membrane according to an embodiment of the present invention.
Figure 5:
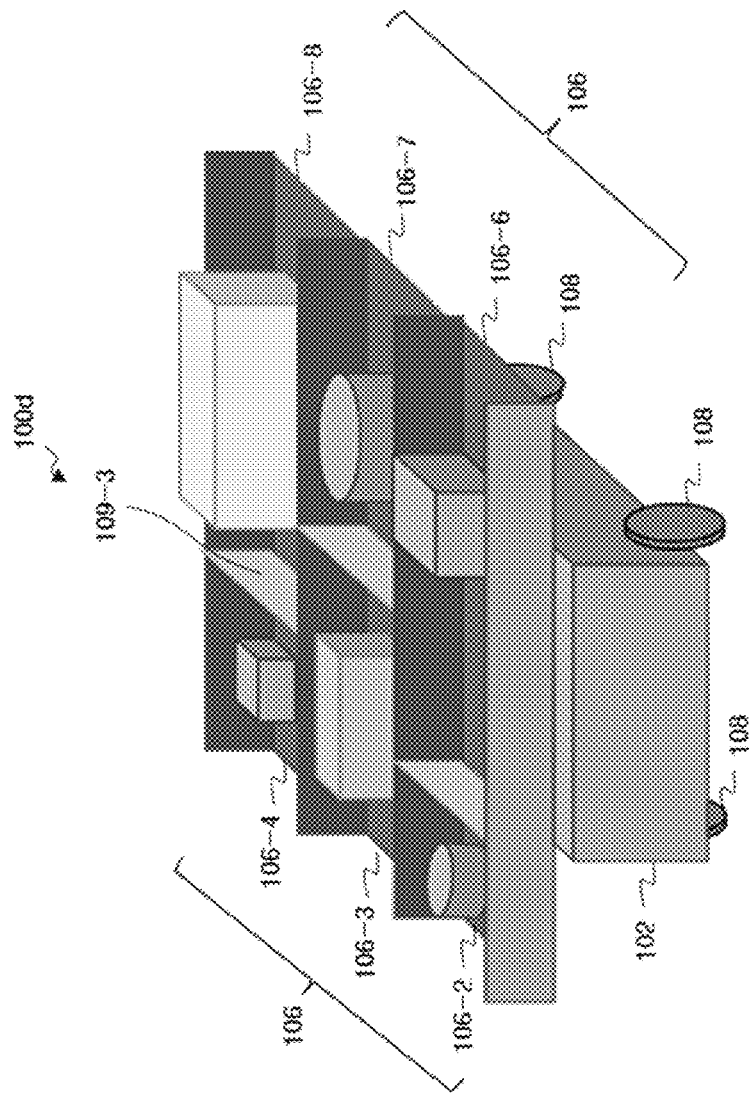

FIGS. 4 and 5 are diagrams illustrating an automated guided vehicle using a transverse membrane according to an embodiment of the present invention.

Referring to FIGS. 1, 4, and 5, the automated guided vehicles 100c and 100d may be discharged to the cargo sorting unit using the method of pushing cargo, instead of the tilting method. For example, the automated guided vehicle 100c includes the cargo loading unit 106 in the horizontal state and transverse membranes 109-1 and 109-2 slidable in a horizontal direction inside each cargo loading unit 106. The discharge control unit 126 moves the transverse membranes 109-1 and 109-2 to push and discharge pieces of cargo. The discharge control unit 126 may be provided with two transverse membranes 109-1 and 109-2 side by side as illustrated in FIG. 4 to separately push cargo in the left direction and the right direction and may push cargo, respectively, while reciprocating in both the left and right directions with one transverse membrane 109-3 as illustrated in FIG. 5. The discharge control unit 126 may push cargo by selecting a specific direction among both discharges when discharging the cargo to one transverse membrane 109-3.

The supply control unit 120 may change an initial location of the transverse membrane 109-3 according to the size of the cargo to be loaded into on the predetermined cargo loading unit. For example, when the size of the cargo is large, it is possible to load large cargo with the transverse membrane 109-3 pushed in the opposite direction. Accordingly, the entire space of the cargo loading unit may be used efficiently.

Figure 6:
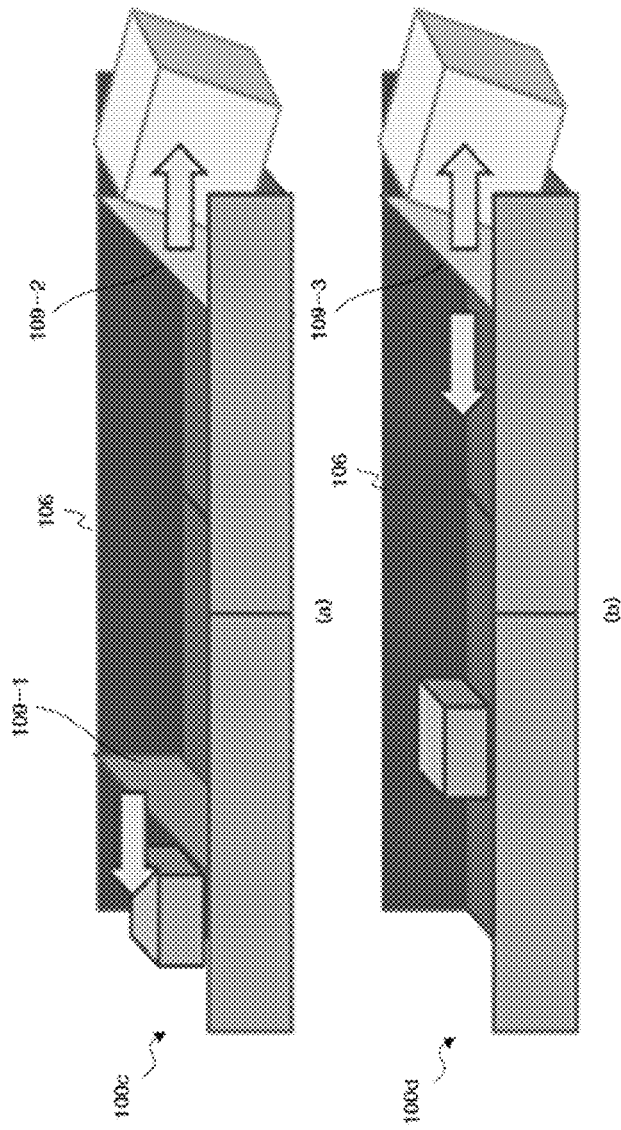
FIG. 6 is a diagram illustrating an example of pushing cargo using a transverse membrane according to an embodiment of the present invention.

FIG. 6 is a diagram illustrating an example of pushing cargo using a transverse membrane according to an embodiment of the present invention.

Referring to FIGS. 1 and 6, as illustrated in FIG. 6A, the discharge control unit 124 may discharge cargo to the cargo sorting unit on the left side through the first transverse membrane 109-1 which is slidable in the left direction and may discharge cargo to the cargo sorting unit on the right side through the second transverse membrane 109-2 which is slidable in the right direction. As another example, as illustrated in FIG. 6B, the discharge control unit 124 may discharge cargo to the cargo sorting unit on the left through the third transverse membrane 109-3 that is slidable in both left and right directions or discharge cargo to the cargo sorting unit on the right.

When pushing the cargo, power is transmitted using a timing belt or a motor screw so that the cargo may move along a sliding guide in a transverse direction of the cargo loading unit 106, and the transverse membranes 109-1, 109-2, and 109-3 are coupled upward to the sliding guide to control each of the transverse membranes 109-1, 109-2, and 109-3, respectively.

Figure 7:
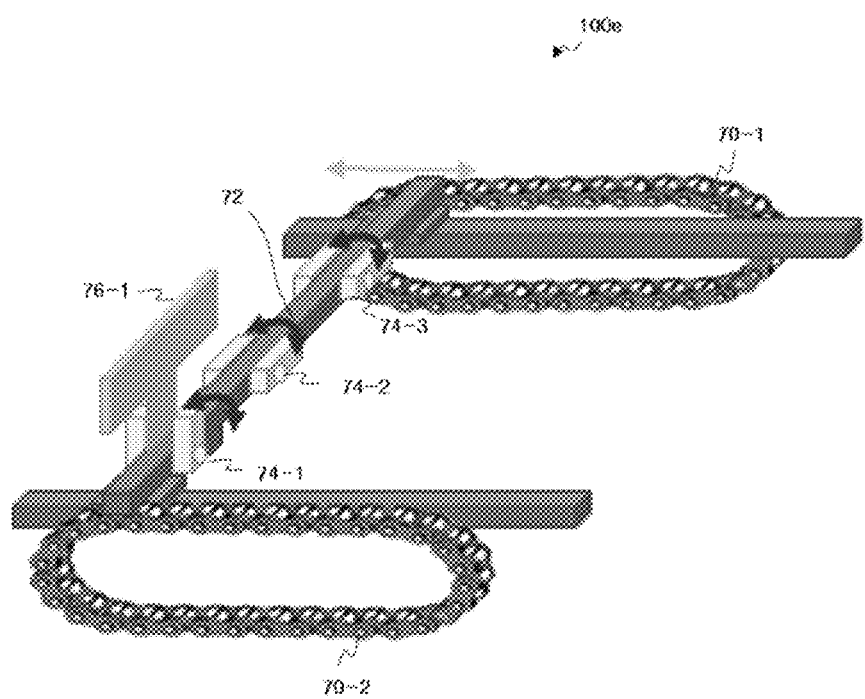
FIGS. 7 and 8 are diagrams illustrating an example of pushing cargo using a transverse membrane according to another embodiment of the present invention.
Figure 8:
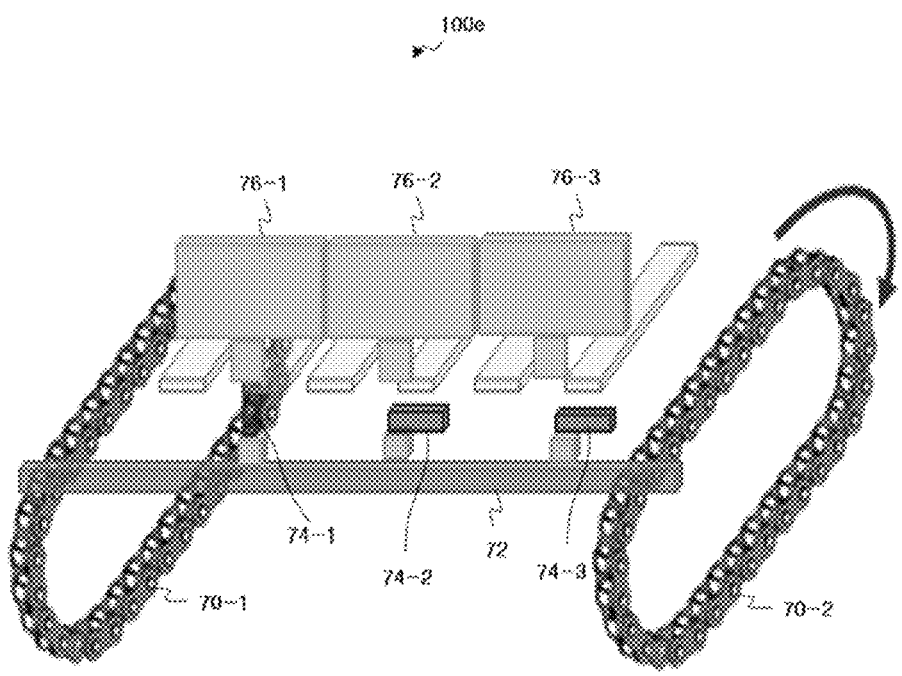

FIGS. 7 and 8 are diagrams illustrating an example of pushing cargo using a transverse membrane according to another embodiment of the present invention.

Referring to FIGS. 1, 7, and 8, an automated guided vehicle 100e includes two driving devices 70-1 and 70-2, a moving bar 72, and attachments 74-1, 74-2, and 74-3, and transverse membranes 76-1, 76-2, and 76-3. In FIGS. 7 and 8, three attachments and three transverse membranes are paired, but the number of attachments and transverse membranes may be expanded or reduced according to the number of cargo loading units. The transverse membrane is provided in a loading space of each cargo loading unit.

Each of the two driving devices 70-1 and 70-2 surrounds an outer periphery of a gear formed therein and is rotated by rotation of a driving shaft fixed to a gear. The driving devices

70-1 and 70-2 may be in the form of a chain or a belt. When the driving devices 70-1 and 70-2 are belts, the gear may be replaced by a belt pulley.

When the two driving devices 70-1 and 70-2 are rotated along the driving shaft, the moving bar 72 connecting between the two driving devices 70-1 and 70-2 is moved together. The plurality of attachments 74-1, 74-2, and 74-3 are formed on the moving bar 72 at an interval, and phases of the attachments 74-1, 74-2, and 74-3 are shifted on the moving bar 72. The phase shift may be performed in a manner of being erected or laid down as illustrated in FIGS. 7 and 8. Each transverse membrane 76-1, 76-2, and 76-3 is connected to each attachment 74-1, 74-2, and 74-3 and thus is erected or laid down by the phase shift of the connected attachments. When the transverse membrane is erected, the cargo in the cargo loading unit is pushed out according to the movement of the moving bar 72. FIG. 7 illustrates an example in which the first transverse membrane 76-1 is erected by the phase shift of the first attachment 74-1. In this case, the transverse membranes that are not erected also move according to the movement of the moving bar 72, but the cargo in the corresponding cargo loading unit can be pushed out only through the erected transverse membrane.

The discharge control unit 124 may select a predetermined transverse membrane among the plurality of transverse membranes 76-1, 76-2, and 76-3 and discharge the cargo to the cargo sorting unit in a manner of pushing the cargo through the selected transverse membrane. To this end, as illustrated in FIGS. 7 and 8, the discharge control unit 124 may select the transverse membrane connected to the attachment in a manner of erecting the predetermined attachment among the attachments 74-1, 74-2, and 74-3 mounted on the moving bar 72. As another example, it is also possible to erect or lay down the transverse membrane by attaching and detaching an electromagnet instead of the attachments 74-1, 74-2, and 74-3.

Figure 9:
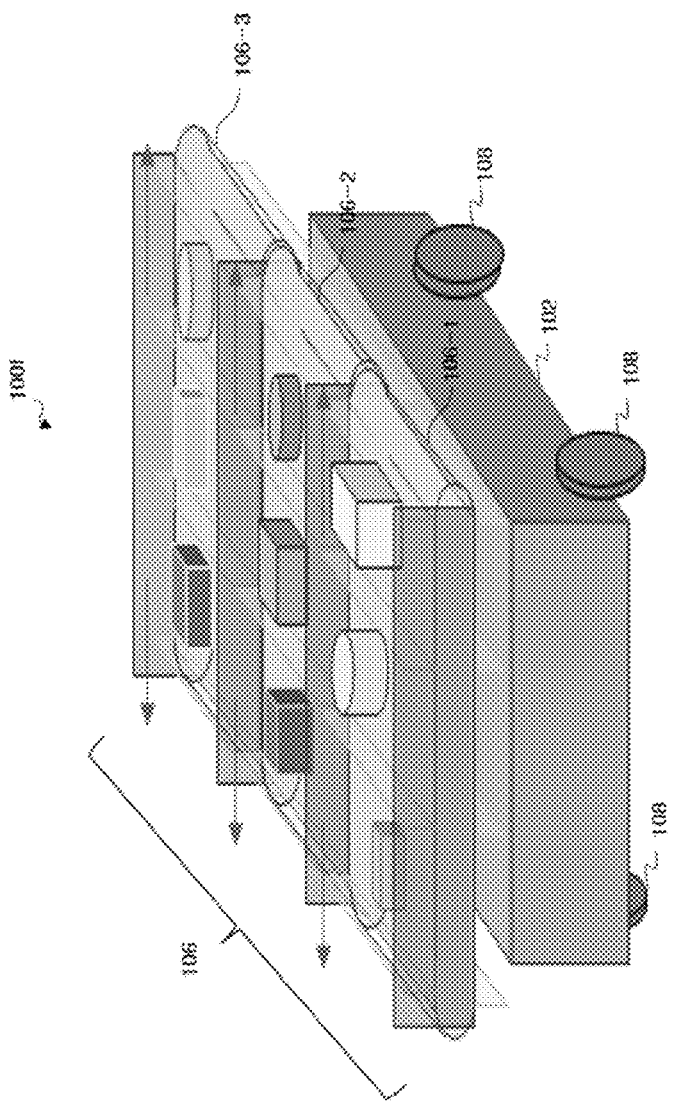
FIG. 9 is a diagram illustrating an automated guided vehicle using attachment according to an embodiment of the present invention.

FIG. 9 is a diagram illustrating an automated guided vehicle using an attachment according to an embodiment of the present invention.

Referring to FIGS. 1 and 9, an automated guided vehicle 100*f* includes a plurality of conveyor belts 90 that are rotated while loading a plurality of pieces of cargo. FIG. 9 illustrates three conveyor belts 90-1, 90-2, and 90-3, but the number of conveyor belts 90 is not limited thereto. Each conveyor belt 90 includes the plurality of cargo loading units 106, and each cargo loading unit 106 is divided using a plurality of attachments 92 to prevent pieces of cargo from mixing with each other. In this case, the discharge control unit 126 may select the discharge of the cargo according to a transport distance of each conveyor belt 90. For example, the discharge control unit 126 rotates the conveyor belt 90 to the right as much as one attachment 92 and thus may discharge only one rightmost cargo to a predetermined cargo sorting unit. In this case, the remaining pieces of cargo in the conveyor belt 90 may be waiting to be discharged to other cargo sorting units. To this end, the automated guided vehicle 100*f* may include an encoder or a sensor to control the transport distance of the conveyor belt 90.

Figure 10:
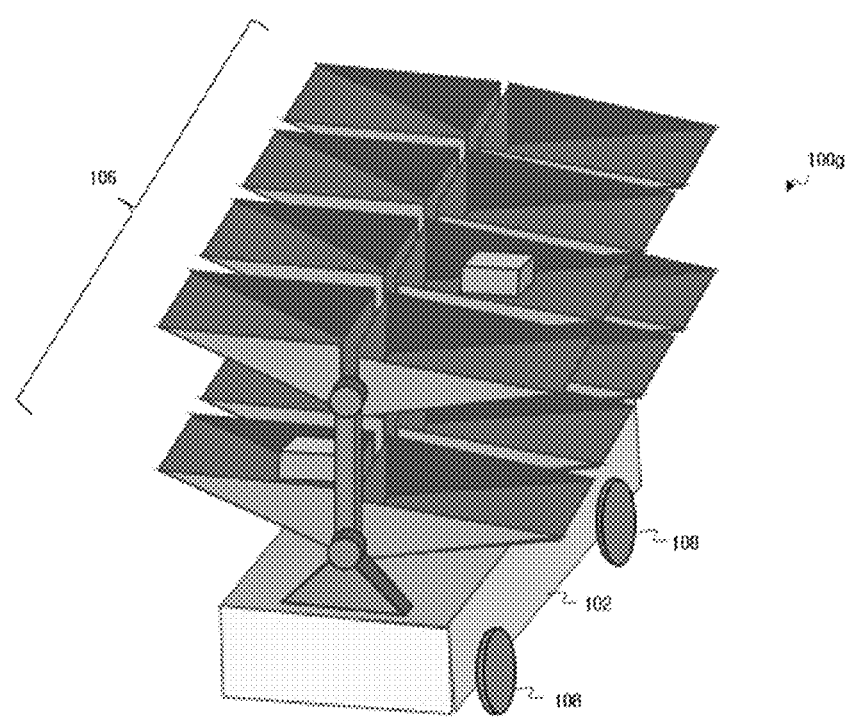
FIG. 10 is a diagram illustrating an automated guided vehicle of a stacked structure according to an embodiment of the present invention.

FIG. 10 is a diagram illustrating an automated guided vehicle of a stacked structure according to an embodiment of the present invention.

Referring to FIGS. 1 and 10, an automated guided vehicle 100*g* may have a plurality of cargo loading units 106 disposed in a stacked structure. For example, as illustrated in FIG. 10, the plurality of cargo loading units 106 may be arranged in two layers.

Figure 11:
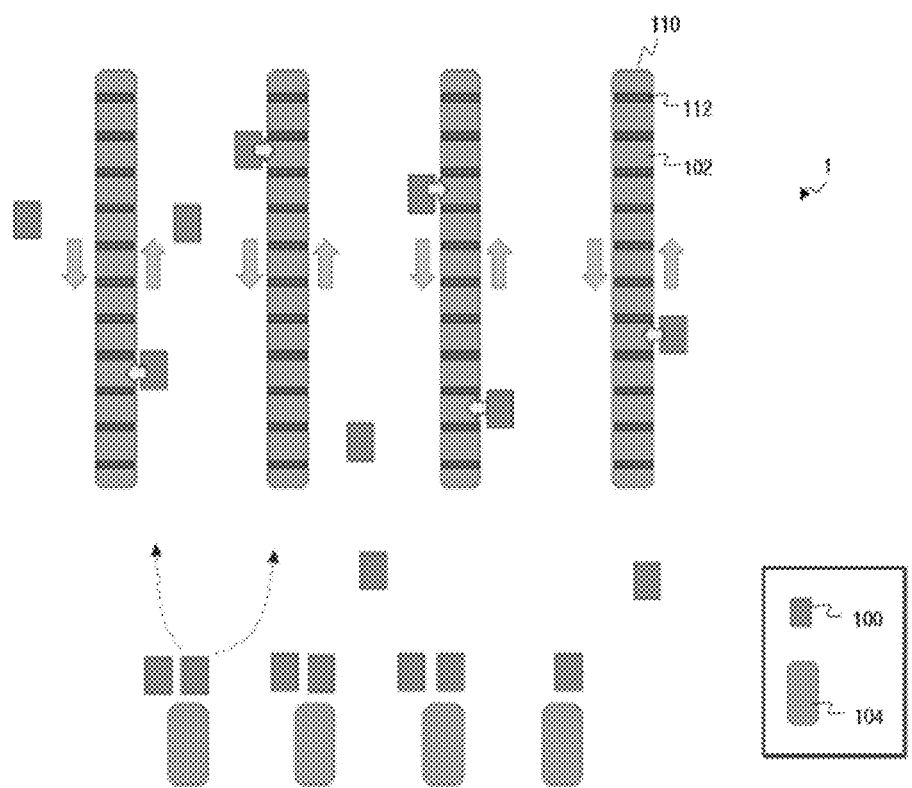
FIG. 11 is a diagram illustrating a cargo sorting unit in a form of a conveyor according to an embodiment of the present invention.

FIG. 11 is a diagram illustrating a cargo sorting unit in a form of a conveyor according to an embodiment of the present invention.

Referring to FIGS. 1 and 11, the system 1 for sorting cargo includes a plurality of cargo supply units 104, a plurality of automated guided vehicles 100, and a plurality of cargo sorting units 102.

Increasing the number of cargo sorting units not only increases costs but also increases costs of collecting from the cargo sorting unit. Accordingly, as illustrated in FIG. 11, the plurality of cargo sorting units 102 may be provided on a conveyor 110 to which a plurality of attachments 112 are attached. As another example, a virtual location on the conveyor 110 may be provided on a divided conveyor. Alternatively, a plurality of tote boxes may be provided on the conveyor 110 mounted on the conveyor. The discharge control unit 126 may discharge the plurality of pieces of cargo loaded into the automated guided vehicle 100 to the plurality of cargo sorting units 102 on the conveyor 110 for sorting. In this case, the plurality of cargo sorting units 102 may be divided through a plurality of attachments on the conveyor 110 or divided into virtual locations on the conveyor 110 or divided through a plurality of tote boxes provided on the conveyor 110.

Figure 12:
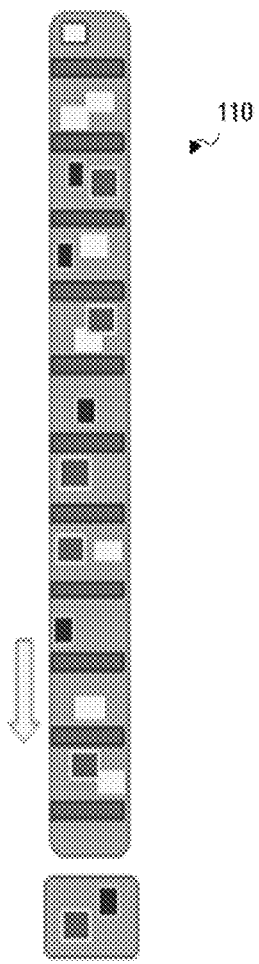
FIG. 12 is a diagram illustrating an example of processing cargo through a movement of a conveyor according to an embodiment of the present invention.

FIG. 12 is a diagram illustrating an example of processing cargo through a movement of a conveyor according to an embodiment of the present invention.

Referring to FIGS. 1 and 12, when the plurality of cargo sorting units 102 are provided on the conveyor 110, the automated guided vehicle 100 sorts cargo on the conveyor 110. When the sorting operation is finished, the cargo loaded on the plurality of cargo sorting units 102 in the conveyor 110 is processed (e.g., packaging, bundled processing, etc.) as the conveyor 110 moves. In this case, there is no need for a separate collection process or a transport device for collection.

Figure 13:
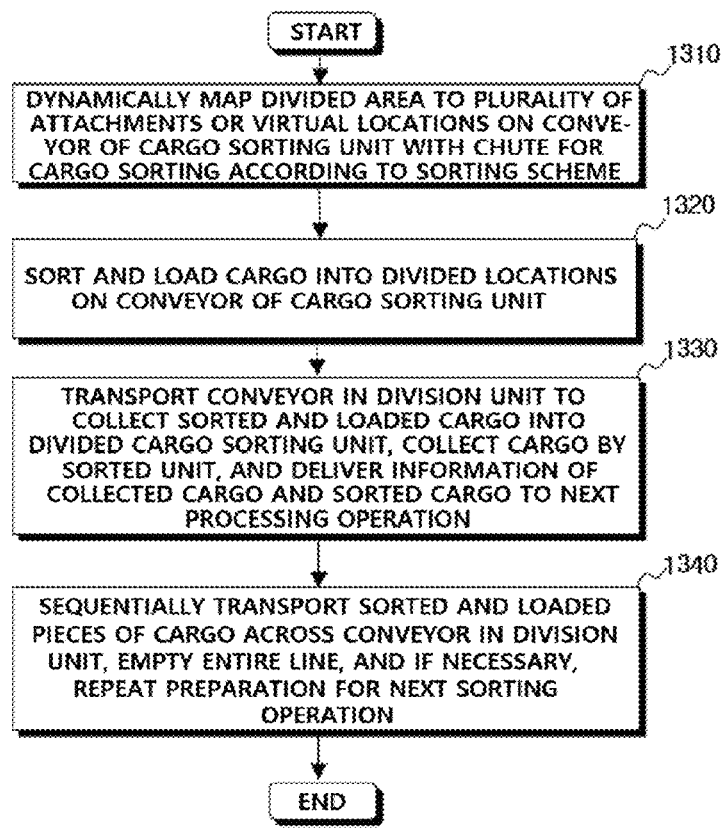
FIG. 13 is a diagram illustrating a flow of a method of sorting cargo using a system for sorting cargo according to an embodiment of the present invention.

FIG. 13 is a diagram illustrating a flow of a method of sorting cargo using a system for sorting cargo according to an embodiment of the present invention.

Referring to FIG. 13, the system for sorting cargo dynamically maps an area divided into a plurality of attachments or virtual locations on the conveyor of the cargo sorting unit into a chute for cargo sorting according to a sorting scheme (1310).

Then, the system for sorting cargo sorts and loads pieces of cargo into divided locations on the conveyor of the cargo sorting unit (1320).

Next, the system for sorting cargo transports the conveyor in division unit to collect the sorted and loaded cargo into the divided cargo sorting unit, collects the cargo by sorted unit, and delivers information of the collected cargo and the sorted cargo to a next processing operation (1330).

Then, the system for sorting cargo sequentially transports the sorted and loaded cargo to the entire conveyor in division unit and empties the entire line (1340). In this case, if necessary, the preparation for the next classification operation is performed repeatedly.

According to the automated guided vehicle, system for sorting cargo, and method of sorting cargo using the same according to an embodiment, it is possible to load and transport a plurality of pieces of cargo using a plurality of cargo loading units of an automated guided vehicle and then discharge the pieces of cargo to a plurality of cargo sorting units for sorting.

It is possible to reduce installation cost of an automated guided vehicle and simplify a device configuration by individually controlling a cargo loading unit using simple methods such as a method of discharging cargo by tilting a cargo loading unit of an automated guided vehicle, a method of pushing cargo in a cargo loading unit using a transverse membrane, and a method of discharging cargo using a conveyor equipped with a plurality of attachments in an automated guided vehicle instead of individually controlling each cargo loading unit of an automated guided vehicle through a motor.

Hereinabove, the present invention has been described with reference to exemplary embodiments thereof. It will be understood by those skilled in the art to which the present invention pertains that the present invention may be implemented in a modified form without departing from essential characteristics of the present invention. Therefore, the exemplary embodiments disclosed herein should be considered in an illustrative aspect rather than a restrictive aspect. The scope of the present invention should be defined by the claims rather than the above description, and equivalents to the claims should be interpreted to fall within the present invention.

What is claimed is:

1. A cargo transport system comprising:
    an automated guided vehicle including a plurality of cargo loading units separated from each other and configured to transport a plurality of pieces of cargo loaded into the plurality of cargo loading units and individually discharge the pieces of cargo to at least one piece of cargo sorting unit;
    a cargo supply unit configured to supply the plurality of pieces of cargo to the automated guided vehicle;
    a plurality of cargo sorting units from which at least one piece of cargo loaded into the automated guided vehicle is discharged;
    a supply control unit configured to load the plurality of pieces of cargo supplied from the cargo supply unit into the plurality of cargo loading units of the automated guided vehicle;
    a transport control unit configured to transport the plurality of pieces of cargo to each cargo sorting unit while controlling a movement path of the automated guided vehicle into which the pieces of cargo are loaded; and
    a discharge control unit configured to:
        discharge at least one piece of cargo transported through the automated guided vehicle to each cargo sorting unit to sort the at least one piece of cargo; and
        when a cargo loaded in a predetermined cargo loading unit arrives at the cargo sorting unit from which the cargo is to be discharged, individually control only the corresponding cargo loading unit and discharge the cargo to the cargo sorting unit at which the cargo arrives.

2. The cargo transport system of claim 1, wherein the automated guided vehicle includes:
    a body;
    a plurality of supports mounted on an upper portion of the body;
    the plurality of cargo loading units supported by each support, having a space into which at least one piece of cargo is loadable, and having the at least one piece of cargo loaded in the space; and
    a plurality of wheels mounted on a lower portion of the body.

3. The cargo transport system of claim 1, wherein each cargo loading unit changes its phase so that the cargo loading units are horizontal or have an inside tilted low to prevent the loaded cargo from falling when entering a ready mode and a moving mode and then have an outside tilted low when entering a discharge mode.

4. The cargo transport system of claim 1, wherein the discharge control unit individually controls each cargo loading unit when entering a discharge mode to tilt a predetermined cargo loading unit and discharge at least one piece of cargo loaded into a corresponding cargo loading unit to a predetermined cargo sorting unit.

5. The cargo transport system of claim 1, wherein each automated guide vehicle includes a plurality of holding members,
    the supply control unit holds the plurality of cargo loading units through each holding member when the automated guided vehicle enters a ready mode, and
    the discharge control unit releases holding of a predetermined holding member when the automated guided vehicle enters a discharge mode and discharges cargo in a corresponding cargo loading unit to a predetermined cargo sorting unit as the cargo loading unit whose holding is released has an outside tilted low due to gravity.

6. The cargo transport system of claim 1, further comprising a tilted guide that is located on a movement path to which the automated guided vehicle returns and includes a tilted part,
    wherein the automated guided vehicle discharges the plurality of pieces of cargo to the plurality of cargo sorting units and then is switched to a ready mode by being pushed up as the tilted cargo loading unit climbs up the tilted part on the movement path to which the automated guided vehicle returns.

7. The cargo transport system of claim 1, wherein each cargo loading unit includes at least one transverse membrane slidable therein, and
    the discharge control unit slides a predetermined transverse membrane to push at least one piece of cargo and discharge the cargo to a predetermined cargo sorting unit.

8. The cargo transport system of claim 7, wherein each cargo loading unit includes:
    a first transverse membrane configured to slide in a first direction; and
    a second transverse membrane configured to slide in a second direction.

9. The cargo transport system of claim 7, wherein each cargo loading unit includes a third transverse membrane configured to slide in a plurality of directions.

10. The cargo transport system of claim 9, wherein the discharge control unit pushes cargo by selecting a predetermined direction from among the plurality of directions when discharging the cargo using the third transverse membrane.

11. The cargo transport system of claim 7, wherein the supply control unit determines a size of cargo to be loaded into a predetermined cargo loading unit and changes an initial location of the transverse membrane in the corresponding cargo loading unit according to the size.

12. The cargo transport system of claim 1, wherein the automated guided vehicle includes:
    two driving devices configured to rotate by power of a driving shaft;
    a moving bar configured to connect two driving devices and move together when the two driving devices rotate;
    a plurality of attachments configured to shift a phase on the moving bar; and a transverse membrane configured to be erected or laid down by the phase shift of each attachment and push cargo in accordance with a movement of the moving bar when erected.

13. The cargo transport system of claim 1, wherein the automated guided vehicle includes at least one conveyor belt including the plurality of cargo loading units, and
   each cargo loading unit is divided through a plurality of attachments for dividing a plurality of areas of each conveyor belt.

14. The cargo transport system of claim 13, wherein the discharge control unit selects a discharge of cargo according to a transport distance of each conveyor belt.

15. The cargo transport system of claim 1, wherein the plurality of cargo sorting units are divided through a plurality of attachments on a conveyor, divided into a virtual location on the conveyor, or divided through a plurality of tote boxes provided on the conveyor.

16. A method of sorting cargo using a system for sorting cargo, the method comprising:
   dynamically mapping a divided area to a plurality of attachments or virtual locations on a conveyor of a cargo sorting unit with a chute for cargo sorting according to a sorting scheme;
   sorting and loading cargo into divided locations on a conveyor of the cargo sorting unit;
   transporting the conveyor in division unit to collect the sorted and loaded cargo into the divided cargo sorting unit, collecting the cargo by sorted unit, and delivering information of the collected cargo and the sorted cargo to a next processing operation;
   sequentially transporting the sorted and loaded pieces of cargo across the conveyor in division unit, emptying the entire line, and if necessary, repeating a preparation for a next sorting operation; and
   in an operation for a next sorting operation, transporting a plurality of pieces of cargo loaded into the plurality of cargo loading units using an automated guided vehicle including a plurality of cargo loading units separated from each other, wherein when a cargo loaded in the predetermined cargo loading unit arrives at the cargo sorting unit from which the cargo is to be discharged, individually controlling only the corresponding cargo loading unit and discharging the cargo to the cargo sorting unit at which the cargo arrives.

* * * * *